W. C. T. DAVIDSON.
Car-Couplings.
No. 147,309. Patented Feb. 10, 1874.
Fig. 1.
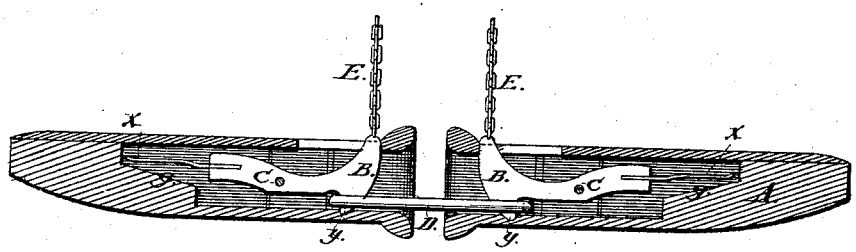
Fig. 2.
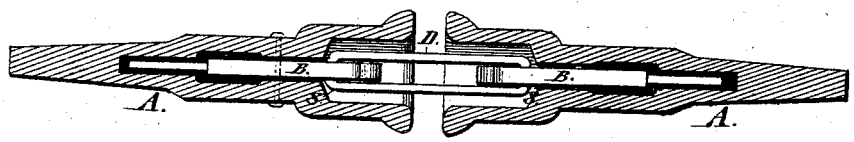
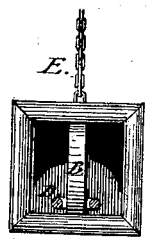
Fig. 3.
Attest:
Edw. W. Donn
M. Gardner
Inventor:
W. C. T. Davidson, by
B. S. Roberts
agt + att'y

UNITED STATES PATENT OFFICE.

WILLIAM C. T. DAVIDSON, OF HANNIBAL, MISSOURI.

IMPROVEMENT IN CAR-COUPLINGS.

Specification forming part of Letters Patent No. 147,309, dated February 10, 1874; application filed December 17, 1873.

*To all whom it may concern:*

Be it known that I, W. C. T. DAVIDSON, of the city of Hannibal, county of Marion and State of Missouri, have invented certain new and useful Improvements in Railway-Car Couplings; and do hereby declare the following specification to be a full and accurate description of the same, reference being had to the annexed drawing making a part thereof.

My invention relates to that class of car-couplings called automatic or self couplers.

Figure 1 of the drawing represents a longitudinal vertical section of the coupling complete; Fig. 2, a horizontal section of the same, and Fig. 3 a front view.

A reference to the drawing and to the following description will enable the skilled mechanic to construct and put the same together.

A is a cast or wrought iron or steel box, called a "draw-head." B is a wrought-iron or steel dog, with a curved latch-head, having a spring inserted in a cleft or split at the rear end of the dog. $g$ is an incline in the rear end of the hollow chamber of the draw-head, so that when the dog B is placed in position to admit the coupling-link, the spring $x$ will rest on the projection $g$, as shown in the drawing. C is a bolt, running through the draw-head A and dog B, in such a manner as to hold the dog B in its proper position, as illustrated in Fig. 1. D is a link of iron or steel, connecting, by means of the dog B, the draw-head A of one car with a corresponding draw-head of another car, or with any other draw-head using a link-connection.

These several parts above described form the car-coupling complete, and the process of coupling two cars together by means of the same is by inserting the link D within the jaws $c\ c$ of draw-head A, and, by a slight push or shove, causing the head of the dog B to rise sufficiently to permit the said link to pass under and be caught by the catch of said dog, marked $y$, the said dog then holding the link firmly in its place in a horizontal position, with one end of the link resting against the projections S S on the inner sides of the draw-head A, in such a manner as to prevent the link from moving farther back within the chamber of the draw-head A. Now cause the two cars to be shoved together, and the link D will strike the inclined head of the dog B in the corresponding draw-head upon the other car, causing the said dog to rise and catch the link, as first described, in draw-head A.

To disconnect or uncouple the cars, pull upon the chain E, fastened to the head of the dog B. This raises the dog B sufficiently to enable the link to pass out when the cars are pushed or pulled apart, thus forming a safe and secure coupling, and one that can be operated without the necessity of a man going between the cars, to the imminent risk of life or limb.

What I claim, and desire to secure by Letters Patent, is—

The hook B, having rear spring $x$, in combination with the draw-head having the incline $g$, as described.

W. C. T. DAVIDSON.

Witnesses:
C. N. CLARK,
M. G. SELLECK.